United States Patent
Glaser

(10) Patent No.: US 11,018,393 B2
(45) Date of Patent: May 25, 2021

(54) BATTERY FRAME

(71) Applicant: Dr. Ing. h.c. F. Porsche Aktiengesellschaft, Stuttgart (DE)

(72) Inventor: Fabian Glaser, Loechgau (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 135 days.

(21) Appl. No.: 16/191,504

(22) Filed: Nov. 15, 2018

(65) Prior Publication Data

US 2019/0157643 A1    May 23, 2019

(30) Foreign Application Priority Data

Nov. 17, 2017   (DE) .................... 10 2017 127 064.7

(51) Int. Cl.
| | |
|---|---|
| *H01M 50/20* | (2021.01) |
| *B60L 50/60* | (2019.01) |
| *B60L 3/00* | (2019.01) |
| *B60L 50/50* | (2019.01) |
| *B60K 6/22* | (2007.10) |

(52) U.S. Cl.
CPC ........... *H01M 50/20* (2021.01); *B60L 3/0007* (2013.01); *B60L 50/66* (2019.02); *B60K 6/22* (2013.01); *B60L 50/50* (2019.02); *B60Y 2200/91* (2013.01); *B60Y 2200/92* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,099,714 B2 | 8/2015 | Bechtold et al. | |
| 9,620,826 B2 | 4/2017 | Yang et al. | |
| 2003/0151242 A1* | 8/2003 | Philipps | B62D 21/02 280/794 |
| 2014/0117716 A1 | 5/2014 | Patberg et al. | |
| 2014/0117717 A1 | 5/2014 | Parkila et al. | |

FOREIGN PATENT DOCUMENTS

| | | |
|---|---|---|
| DE | 10 2011 051 698 | 1/2013 |
| DE | 10 2014 226 566 | 4/2016 |
| JP | 2005132200 A * | 5/2005 |

OTHER PUBLICATIONS

German Search Report dated Aug. 2, 2018.

* cited by examiner

*Primary Examiner* — Eli S Mekhlin
(74) *Attorney, Agent, or Firm* — Gerald E. Hespos; Michael J. Porco; Matthew T. Hespos

(57) ABSTRACT

A battery frame (1) is provided for accommodating battery modules in a motor vehicle that can be driven electrically at times. The battery frame (1) has two outer longitudinal members (2) spaced apart from one another and outer (3) and inner crossmembers (4) connected thereto. Receptacles (5) for the battery modules are formed between the crossmembers (3, 4). Each outer longitudinal member (2) has a C-shaped profile. Ends of the inner crossmembers (4) engage in the C profile of the respective longitudinal member (2) via a deformation element (7). Thus, the battery frame has good crash performance in the event of a pole impact, and a relatively large accommodating volume.

16 Claims, 1 Drawing Sheet

BATTERY FRAME

CROSS REFERENCE TO RELATED APPLICATION

This application claims priority under 35 USC 119 to German Patent Appl. No. 10 2017 127 064.7 filed on Nov. 17, 2017, the entire disclosure of which is incorporated herein by reference.

BACKGROUND

Field of the Invention

The invention relates to a battery frame for accommodating battery modules in a motor vehicle that is drivable electrically at least part of the time.

Related Art

A battery frame of a vehicle generally has two outer longitudinal members spaced apart from one another and outer and inner crossmembers connected to the longitudinal members. The battery modules are formed between the crossmembers. Such battery frames generally are in the floor region of motor vehicles. Additionally, battery frames should be very stable and should have optimal deformation properties in the event of a pole impact, i.e. when force is transmitted via a pole into the battery frame in the region of an outer longitudinal member. Generally, a battery frame consists of hollow profiles that are joined together via a T joint.

DE 10 2014 226 566 B3 discloses a battery frame that has two crossmembers and two longitudinal members. The longitudinal members are connected to the crossmembers via node elements.

U.S. Pat. No. 9,099,714 B2 describes a battery frame having deformation elements in the form of springs.

U.S. Pat. No. 9,620,826 B2 discloses a battery frame having a C-shaped carrier, and flat battery cells are arranged in the C-shaped carrier.

US 2014/0117717 A1 describes a battery frame assembled from plural tubular elements and plural U-shaped elements.

An object of this invention is to provide a battery frame that it has a particularly good crash performance in the event of a pole impact and also a relatively large accommodating volume.

SUMMARY

The invention relates to a battery frame with two longitudinal members, each of which has a C-shaped profile. Inner crossmembers have ends engaged in the C profile of the respective outer longitudinal member via a deformation element.

In contrast to a design of the longitudinal member with a closed hollow profile, the outer longitudinal member embodied as a C-shaped profile creates an additional accommodating volume in the battery frame, since this region of the battery frame that is enclosed by the C-shaped longitudinal member provides an additional packaging volume, in particular for cooling, high-voltage lines etc. Apart from this, the attachment of the inner crossmembers to the outer longitudinal members via the deformation elements in this region brings about a particularly favorable crash performance of the battery frame. In the event of a pole test, this region of the battery frame acts on the relevant outer longitudinal member assigned to the pole. In the event of an impact with a pole, the upper and lower legs of the C profile can bend open. Thus, the C profile can deform as far as the crosspiece connecting the two legs, and accordingly as far as the back of the C profile, without the deforming longitudinal member damaging the battery modules. As a result, a greater intrusion path of the pole into the battery frame can be allowed than when the outer longitudinal members are in the form of a hollow profile. This also allows optimal exploitation of the packaging volume in the event of a crash. A greater intrusion path and more time for breaking down the impact energy make it possible to construct a lighter battery frame. Thus, a significant weight saving can be achieved as compared with battery frames with hollow longitudinal profiles.

The crossmembers may be hollow bodies. For example, the crossmembers may be square tubes. Such crossmembers are standard parts.

Each deformation may be arranged to be plugged into or onto an end of the respective inner crossmember and is connected to this inner crossmember, for example by being screwed therein.

The deformation element has a particularly simple spatial configuration when it is formed in a cuboidal manner.

Each deformation element is connected to the respective longitudinal member. The connection can take place in a wide variety of ways, such as with screw connections.

In one embodiment, the two outer crossmembers engage, in the region of their respective ends, directly in the C profile of the relevant longitudinal member. In this case, each outer crossmember may be connected to the respective longitudinal member. Therefore, in this embodiment, no deformation elements are provided for the outer crossmembers. This is because, in this situation, the vehicle is rotated about the pole during the crash test on account of the center of gravity and accordingly an outer crossmember without a deformation element is sufficient.

In one embodiment, each outer longitudinal member has a C-shaped profile with a reinforcement at least in the region of the transitions from two legs of the C to a crosspiece connecting the legs. In a crash test, forces thus additionally are broken down via the reinforcement of the longitudinal member. In particular, the reinforcement is in the form of a C-shaped profile and extends over the crosspiece connecting the two legs of the C. The reinforcement may extend along the length of the respective outer longitudinal member. In this way, the longitudinal member is reinforced along its length.

The C-profile of each outer longitudinal member creates additional packaging volume along the length of the respective outer longitudinal member between the battery modules and the outer longitudinal members. This additional packaging volume is interrupted at most by the deformation elements. If appropriate, each deformation element can be provided with an aperture so that components can be passed to the battery modules. These components may relate to cooling, high-voltage lines, even in the region of the deformation element The battery frame may have at least one inner longitudinal member disposed between the two outer longitudinal members and connected to the crossmembers. In this case, the battery frame accommodates a battery module between one outer longitudinal member, the inner longitudinal member and two adjacent crossmembers.

The longitudinal members and/or the crossmembers, in particular the frame as a whole, may be super high strength steel. This results in high rigidity of the battery frame, such that in the event of a crash, any deformation of the battery frame with an effect on the battery modules is substantially ruled out.

The battery frame may have a baseplate connectable to the bottom of the battery frame and/or a cover plate connectable to the top of the battery frame.

Further features of the invention are apparent from the appended drawings and the description of the embodiment depicted in the drawings.

DETAILED DESCRIPTION

Figure 1:
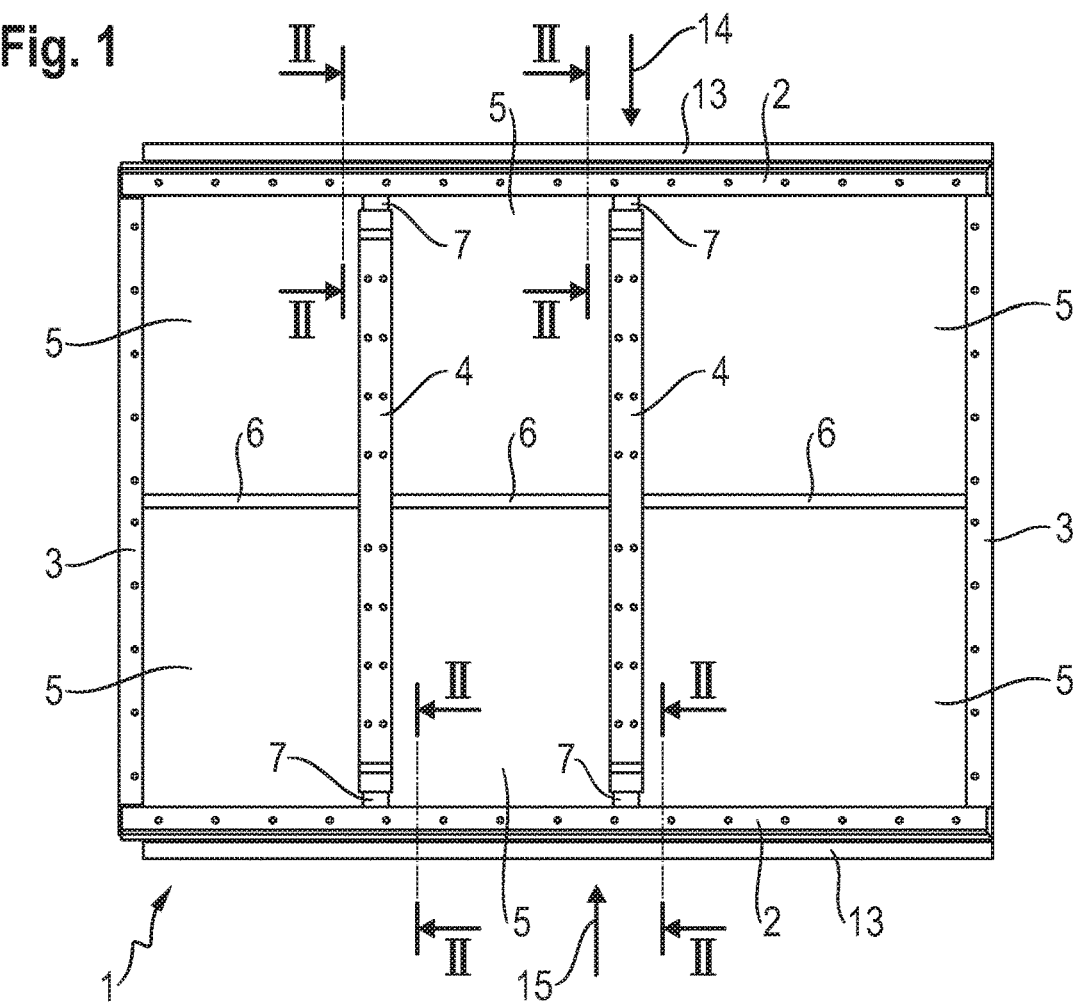
FIG. 1 is a plan view of a battery frame for accommodating battery modules in a motor vehicle that is driven electrically at least part of the time.

A battery frame 1 has two outer longitudinal members 2 spaced apart from one another. Two outer crossmembers 3 and two inner crossmembers 4 are connected perpendicularly to the outer longitudinal members 2 and are arranged so that the inner crossmembers 4 are between and parallel to the outer crossmembers 3. Receptacles 5 for battery modules (not illustrated) are formed between the crossmembers 3, 4.

The battery frame 1 is arranged horizontally with regard to the usual orientation of a motor vehicle. Additionally, the outer longitudinal members 2 extend in the longitudinal direction of travel of the vehicle, and the crossmembers 3, 4 extend in the transverse direction of the vehicle. An inner longitudinal member 6 is parallel to the two outer longitudinal members 2 at a position between the outer longitudinal members 2 and connects the crossmembers 3, 4 together.

Each outer longitudinal member 2 has a C-shaped profile. Ends of the inner crossmembers 3, 4 engage respectively in the C profile of the respective outer longitudinal member 2 via a deformation element 7. The crossmembers 3, 4 are hollow bodies designed as square tubes with a rectangular cross section.

Each deformation element 7 is plugged into an end of the respective inner crossmember 4 and is connected to the inner crossmember 4 by screw connections. The deformation element is formed in a cuboidal manner and connected to the respective outer longitudinal member 2.

By contrast, the ends of the two outer crossmembers 3 engage directly in the C profile of the respective outer longitudinal member 2 and are connected to the respective outer longitudinal member 2.

The C profile of each outer longitudinal member 2 is defined by two legs 8, 9, a crosspiece 10 connecting the legs 8, 9 and a reinforcement 11 in the region of the transitions from the legs 8, 9 and the crosspiece 10. This reinforcement 11 also has a C-shaped profile to extend over the crosspiece 10 and also over a region of the legs 8, 9. The reinforcement 11 extends along the length between the two inner crossmembers 4 along the respective outer longitudinal member 2.

Each outer longitudinal member 2 forms a receptacle 12 for components that are used with the battery modules, such as cooling lines and/or high-voltage lines. This receptacle 12 is between the respective outer longitudinal member 2 and the battery module assigned to the outer longitudinal member 2.

Figure 2:
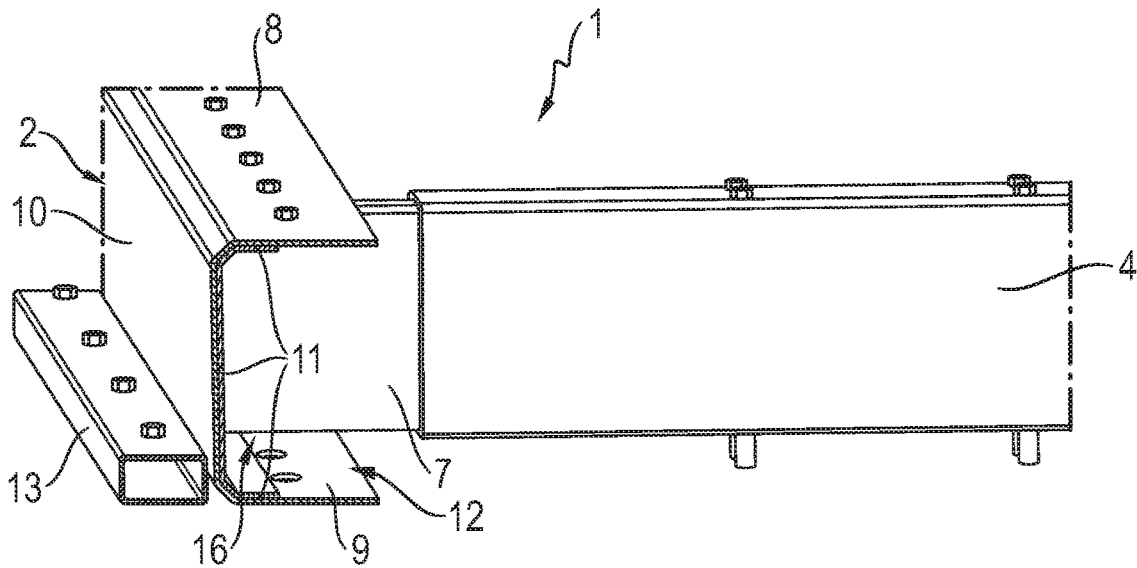
FIG. 2 is a section taken along lines II-II in FIG. 1.

FIG. 2 illustrates that an aperture 16 is formed beneath the deformation element 7 and between the deformation element 7 and the leg 9. Thus, cooling lines and/or high-voltage lines can be passed along the entire length of the respective outer longitudinal member 2 in the region of the battery modules.

The longitudinal members 2, 6 and the crossmembers 3, 4 preferably are formed from super high strength steel.

A baseplate (not illustrated) is connectable to the battery frame 1 on its underside and a cover plate (not illustrated) is connectable to the battery frame 1 on its top side. The baseplate is screwed to the battery frame 1 and the battery modules rest on the baseplate. The baseplate is screwed to the outer longitudinal members 2 and the outer crossmembers 3 in the region of the outer longitudinal members 2. In a corresponding manner, the cover plate is screwed to the outer longitudinal members 2 and the outer crossmembers 3. The cover plate covers the top part of the interior of the battery frame 1 in which the battery modules are located. The baseplate is screwed to the legs 9 of the outer longitudinal members 2 and to the outer crossmembers 3 in the region of their underside. The cover plate is screwed to the legs 8 of the outer longitudinal members 2 and to the top side of the outer crossmembers 3.

A side of each outer longitudinal member 2 facing away from the crossmembers 3, 4 is connected to a reinforcing profile 13. Each reinforcing profile has a rectangular cross section, oriented with a long profile side perpendicular to the crosspiece 10.

In a pole crash test, an impact force acts in the direction of the arrow 14 on one outer longitudinal member 2 or in the direction of the arrow 15 on the other outer longitudinal member 2, and thus acts horizontally on the particular outer longitudinal member 2 horizontally and perpendicular thereto. This central force application causes a deformation of the battery frame 1 in the region of the deformation elements 7 and approximately halfway along the respective outer longitudinal member 2 facing the force application point. For the outer crossmembers 3, no deformation elements are required, since in this situation, the vehicle is rotated about the pole due to the center of gravity and accordingly a crossmember without a deformation element is sufficient.

LIST OF REFERENCE SIGNS

1 Battery frame
2 Outer longitudinal member
3 Outer crossmember
4 Inner crossmember
5 Receptacle
6 Inner longitudinal member
7 Deformation element
8 Leg
9 Leg
10 Crosspiece
11 Reinforcement
12 Receptacle
13 Reinforcing profile
14 Arrow
15 Arrow
16 Aperture

What is claimed is:

1. A battery frame for accommodating battery modules in a motor vehicle that is capable of being driven electrically at times, the battery frame comprising: two outer longitudinal members spaced apart from one another and outer crossmembers and inner crossmembers connected to the outer longitudinal members with the inner crossmembers being between the outer crossmembers, receptacles for the battery modules being formed between the crossmembers, each of the outer crossmembers and the inner crossmembers being a hollow tubular body, each outer longitudinal member having a C-shaped profile with an open side, the open sides of the two outer longitudinal members facing one another, deformation elements having an inner end plugged into or onto respective ends of the inner crossmembers and connected to the respective inner crossmember, each of the deformation elements further having an outer end engaged in the open side of the C profile of the respective outer longitudinal member, wherein the deformation elements accommodate deformation of the outer longitudinal members as far as the inner crossmembers.

2. The battery frame of claim 1, wherein the crossmembers are tubes having a rectangular cross section.

3. The battery frame of claim 1, wherein each of the deformation elements has a cuboidal shape.

4. The battery frame of claim 1, wherein each of the deformation elements is connected to the respective outer longitudinal member.

5. The battery frame of claim 1, wherein the two outer crossmembers are engaged directly in the C profile of the respective outer longitudinal member.

6. The battery frame of claim 5, wherein each of the outer crossmembers is connected to the respective outer longitudinal member.

7. The battery frame of claim 1, wherein the C-profile of each of the longitudinal members is defined by two legs and a crosspiece connecting the legs, the battery frame further comprising reinforcements connected respectively to the outer longitudinal members at least in a region of transitions from the legs of the C-profile to the crosspiece.

8. The battery frame of claim 7, wherein each of the reinforcements defines a C-shaped profile with inner legs disposed on opposed facing surfaces of the legs of the respective longitudinal member and an inner crosspiece engaged against the crosspiece of the respective longitudinal member, projecting distances of the inner legs from the crosspiece of the respective reinforcement being less than projecting distances of the legs from the crosspiece of the respective longitudinal member so that spaces are defined adjacent of projecting ends of the inner legs and between the legs of the longitudinal member and the respective deformation element so that components for the battery modules can be passed through the spaces.

9. The battery frame of claim 8, wherein each of the reinforcements extends along a length of the respective outer longitudinal member.

10. The battery frame of claim 1, wherein each of the outer longitudinal members forms a receptacle for high-voltage lines and/or cooling lines between the outer longitudinal member and battery modules facing said longitudinal member.

11. The battery frame of claim 1, further comprising at least one inner longitudinal member between the two outer longitudinal members and connected to the crossmembers.

12. The battery frame of claim 11, wherein the battery frame forms receptacles for a battery module between one outer longitudinal member, the inner longitudinal member and two of the crossmembers.

13. The battery frame of claim 1, wherein the longitudinal members and the crossmembers are formed from super high strength steel.

14. The battery frame of claim 1, further comprising a plate connected to at least one of an underside or a top of the battery frame.

15. The battery frame of claim 1, further comprising tubular reinforcing profiles extending along the respective longitudinal members and attached surfaces of the longitudinal members opposite the crosspieces.

16. The battery frame of claim 15, wherein each of the tubular reinforcing profiles has a rectangular cross-section that defines a width parallel to extending directions of the crosspieces and a height transverse to extending directions of both the crosspieces and the longitudinal members, the widths of the tubular reinforcing profiles being greater that the heights thereof.

* * * * *